US012724742B1

(12) United States Patent
Bhardwaj et al.

(10) Patent No.: US 12,724,742 B1
(45) Date of Patent: Sep. 1, 2026

(54) SYSTEM AND METHOD TO PURGE DATA IN AN AGNOSTIC MANNER USING GRAINS

(71) Applicant: Morgan Stanley Services Group Inc., New York, NY (US)

(72) Inventors: Madhur Dutt Bhardwaj, Mumbai (IN); Megha Dhar, Mumbai (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/399,906

(22) Filed: Nov. 25, 2025

(51) Int. Cl.
*G06F 16/11* (2019.01)

(52) U.S. Cl.
CPC .................................. *G06F 16/122* (2019.01)

(58) Field of Classification Search
CPC ..................................................... G06F 16/122
See application file for complete search history.

(56) References Cited

U.S. PATENT DOCUMENTS 5,813,009 A 9/1998 Johnson et al.
6,185,576 B1 2/2001 McIntosh
7,730,114 B2 * 6/2010 Bybee ..................... G06F 16/13 707/825
8,271,451 B2 9/2012 Steffan
9,288,184 B1 3/2016 Kvamme et al.
9,361,304 B2 * 6/2016 Hobart .................. G06F 16/125
10,558,612 B1 * 2/2020 Schiel ................... G06F 16/284
11,960,619 B1 4/2024 Florentino et al.
12,222,896 B1 2/2025 de Gaia et al.
12,596,840 B1 * 4/2026 Tummalapalli ....... G06F 16/125
2004/0088313 A1 5/2004 Torres
2004/0133608 A1 * 7/2004 Saake .................. G06F 16/113
2010/0161493 A1 6/2010 Bennau et al.
2013/0276026 A1 10/2013 Sherwin et al.
2014/0082749 A1 3/2014 Holland et al.
2015/0213288 A1 7/2015 Bilodeau et al.
2015/0347548 A1 12/2015 Mortensen et al.
2018/0075138 A1 3/2018 Perram et al.
2018/0329940 A1 * 11/2018 Tiku ........................ G06F 9/546
(Continued)

FOREIGN PATENT DOCUMENTS

AU 2002360252 A1 * 4/2003
CN 111651443 A * 9/2020 .......... G06F 11/1458
(Continued)

*Primary Examiner* — Apu M Mofiz
*Assistant Examiner* — Hubert Cheung
(74) *Attorney, Agent, or Firm* — Leason Ellis LLP

(57) ABSTRACT

A system and method to purge data from databases using grains. The system includes a database and an agnostic data purge system. The database stores a current data table, and the agnostic data purge system includes a processor which generates an identification identifying the current data table, associates the identification with a purge statement to perform a data purge of the current data table, and generates a control table entry associating the purge statement with a grain for the data purge. The database performs the data purge of the current data table upon execution of the extracted purge statement and the grain with the data purge is independent of and agnostic of a specification of a data management platform, and the processor generates an updated data table as the current data table based on the purge data and non-purge data. The method implements the system.

17 Claims, 10 Drawing Sheets

(56) References Cited

U.S. PATENT DOCUMENTS

| | | | | |
|---|---|---|---|---|
| 2019/0294707 | A1 | 9/2019 | Ramaswamy et al. | |
| 2021/0150056 | A1 | 5/2021 | Vax et al. | |
| 2021/0279365 | A1 | 9/2021 | Apsingekar et al. | |
| 2021/0281409 | A1 | 9/2021 | Apsingekar et al. | |
| 2021/0286684 | A1* | 9/2021 | Nara | G06F 11/1464 |
| 2022/0012134 | A1* | 1/2022 | Chatterjee | H04L 67/1097 |
| 2022/0247726 | A1 | 8/2022 | Mooney et al. | |
| 2022/0309168 | A1 | 9/2022 | Coulter | |
| 2023/0020330 | A1 | 1/2023 | Schwerin et al. | |
| 2023/0090611 | A1 | 3/2023 | Ciampaglia et al. | |
| 2023/0140153 | A1* | 5/2023 | Jernigan, IV | H04L 45/30<br>707/703 |
| 2023/0147671 | A1* | 5/2023 | Narulkar | G06F 21/79<br>707/692 |
| 2023/0224332 | A1 | 7/2023 | Zhong et al. | |
| 2023/0297547 | A1* | 9/2023 | Raju | G06F 16/113<br>707/640 |
| 2023/0409441 | A1* | 12/2023 | Sharma | G06F 11/1451 |
| 2025/0117399 | A1* | 4/2025 | Li | G06F 16/27 |

FOREIGN PATENT DOCUMENTS

| | | | | | |
|---|---|---|---|---|---|
| CN | 116302675 | A | * | 6/2023 | G06F 11/1448 |
| CN | 119357168 | A | * | 1/2025 | G06F 16/1748 |
| CN | 119415598 | B | * | 11/2025 | G06F 16/275 |

* cited by examiner

| NAME OF COLUMN IN TABLE | CATEGORY |
|---|---|
| COLUMN01 | NOT PURGED |
| COLUMN02 | PURGED |
| COLUMN03 | PURGED |
| COLUMN04 | PURGED |
| COLUMN05 | PURGED |
| COLUMN06 | PURGED |
| COLUMN07 | NOT PURGED |
| COLUMN08 | NOT PURGED |
| COLUMN09 | NOT PURGED |
| COLUMN10 | NOT PURGED |
| COLUMN11 | NOT PURGED |
| COLUMN12 | NOT PURGED |
| COLUMN13 | NOT PURGED |

800

```
SELECT DATABASENAME, TABLENAME FROM DBC.COLUMNS
WHERE
UPPER(COLUMNNAME) = 'COLUMN01' AND
UPPER(DATABASENAME) LIKE '%DATA%'
```

FIG. 8

SYSTEM AND METHOD TO PURGE DATA IN AN AGNOSTIC MANNER USING GRAINS

FIELD OF THE DISCLOSURE

The present disclosure relates generally to purging data from databases, and, more particularly, to a system and a method to purge data from databases in an agnostic manner using grains.

BACKGROUND OF THE DISCLOSURE

Organizations such as corporations and institutions implement computer systems with storage facilities, such as local memories, local or distributed databases, data farms, and other forms of storage to receive, process, store, and distribute data in multiple ways to multiple systems, subsystems, applications, and processes in order to perform the operations of the organizations. Such organizations routinely purge data from their computer systems for various reasons, including avoiding overloading the capacity of the storage facilities, removing outdated data and applications occupying memory, and meeting regulatory or policy requirements.

Such regulatory and policy requirements can include requirements to retain certain records or to purge other records, including personal information (PI) or personally identifiable information (PII), as well as data of transactions and interaction histories associated with employees, clients, patients, or other organizations. Other policy requirements can include reducing the exposure of an organization to risk associated with storing data associated with employees, clients, patients, or other organizations, with such stored data including sensitive or non-sensitive information. The stored data can be stored in accounts, and a policy requirement can include purging closed or inactive accounts immediately or after a set period of data retention time.

Further regulatory or policy requirements can include partial purging or masking of data, such as specific data personal information or personally identifiable information. For example, a social security number can be completely purged, or can be masked to retain only the last four digits of the social security number. Additional regulatory or policy requirements can include purging data for specific use cases.

Purging can further include deleting the data from all data tables or databases in which reference data is stored, such as account details and client details. As shown in FIG. 1, for an organization, a system 100 in the prior art includes a database 102 storing data of the organization and managed by a data management system 104. The database 102 can provide a purged account list and a hard delete date to the data management system 104 for managing and performing the purging. The data management system 104 can include an enterprise data warehouse (EDW) that can be a centralized repository storing integrated data from across the systems of an organization to support reporting, analytics, and decision-making. An EDW can enable consistent data access, historical tracking, and high-performance queries for business intelligence.

One example of a data management system 104 is an EDW operating a system platform complying with the TERADATA framework available from TERADATA CORPORATION. Another example of a data management system 104 is a system platform complying with the HADOOP framework which is a collection of open-source software utilities for reliable, scalable, distributed computing and available from THE APACHE SOFTWARE FOUNDATION.

The system 100 includes tables 106, 108, 110, labeled "TABLE 1", "TABLE 2", etc. to "TABLE M", respectively, in which M is a positive integer greater than or equal to 1. A purge controller 112 performs purging or retention of data in the tables 106, 108, 110, and a data preservation controller 114 designates the data 116 to be purged, and designates the data 118 to be preserved. In one example, the data 116 to be purged complying with the TERADATA framework can be designated by the label TERADATA_PURGE_DATABASE. In another example, the data 116 to be purged complying with the HADOOP framework can be designated by the label HADOOP_PURGE_REFINERY.

The data management system 104, such as an EDW, can run a number of processes for managing the purging of data. One process includes performing a soft delete in at least one the tables 106, 108, 110. Another process includes performing a truncate and reload approach in which for at least one of the tables 106, 108, 110, only current data is retained, but the tables 106, 108, 110 do not preserve the history of data in the tables 106, 108, 110. As a result, the purged accounts are not reported for the tables 106, 108, 110. For data in the database 102 in which no purge is performed, the data management system 104 can generate truncation (trunc) and load tables indicating the retained current data resulting from the truncate and reload process.

In a further process, at least one of the tables 106, 108, 110 is a Slowly Changing Dimension (SCD) table, which stores the history of the stored data, and even after purging, the historical records are maintained. The data management system 104 performs a hard delete on the data in the purged account list from the database 102, and the SCD table stores non-purged data and the historical records.

In addition, the data management system 104 performs a hard delete on the data in at least one table 106, 108, 110 in the purged accounts from the database 102, resulting in hard deleting of data in transaction tables and main core tables from the at least one table 106, 108, 110. The purge controller 112 can make exclusions and exceptions from the data 116 to be purged, with such exclusions and exceptions stored as the data 118 to be preserved, as well as non-PII data being preserved while masking the PII data.

Once the data 116 to be purged is set, the history and actions on data 116 are retained for a set time such as one year. After the set time expires, revival of purged accounts may be necessary. In addition, for some analytical projects, some attributes of historical accounts are retained.

The implementation and operation of data purging systems such as the system 100 in the prior art for purging data from the database 102 is highly dependent on the framework of the system platform such as the TERADATA framework or the HADOOP framework.

SUMMARY OF THE DISCLOSURE

According to an implementation consistent with the present disclosure, a system and a method purge data from databases in an agnostic manner using grains.

In an implementation, a computer-based system comprises a database and an agnostic data purge system. The database stores a current data table, and the agnostic data purge system includes a hardware-based processor and a memory. The hardware-based processor is operatively connected to a data management platform and to the database, wherein the hardware-based processor is configured to generate an identification identifying the current data table, to associate the identification with a purge statement configured to perform a data purge of the current data table, and to generate a control table entry associating the purge statement with a grain for the data purge. The memory is configured to store instructions and configured to provide the instructions to the hardware-based processor.

The database is responsive to receiving the control table entry to extract the purge statement and the grain from the control table entry, and to perform the data purge of the current data table upon execution of the extracted purge statement and the grain to generate purge data and non-purge data, wherein the performance of the data purge is independent of and agnostic of a specification of the data management platform based on execution of the extracted purge statement and the grain. The hardware-based processor generates an updated data table as the current data table based on the purge data and non-purge data.

The hardware-based processor can distribute the control table entry to the database. The agnostic data purge system can include a clock configured to determine whether a predetermined update period has elapsed, wherein in a case that the predetermined update period has elapsed, the hardware-based processor can generate a new identification identifying the current data table, associate the identification with a new purge statement configured to perform a new data purge of the current data table, and generate a new control table entry associating the new purge statement with a new grain for the new data purge. In the case that the predetermined update period has elapsed, the database, responsive to receiving the new control table entry, can extract the new purge statement and the new grain from the new control table entry, and can perform the new data purge of the current data table upon execution of the extracted new purge statement and the new grain to generate new purge data and new non-purge data, wherein the performance of the new data purge can be independent of and agnostic of a specification of the data management platform based on execution of the extracted new purge statement and the new grain. In the case that the predetermined update period has elapsed, the hardware-based processor can generate a new updated data table based on the new purge data and the new non-purge data, and in a case that the predetermined update period has not elapsed, can check the clock to determine whether the predetermined update period has elapsed.

The agnostic data purge system can include a clock configured to associate a timestamp with the purge data and to determine whether a predetermined purge period has elapsed, wherein in a case that the predetermined purge period has elapsed based on the timestamp, the hardware-based processor can perform a final purge of the purge data, and wherein in a case that the predetermined purge period has not yet elapsed, the clock can determine whether a predetermined purge period has elapsed. The predetermined purge period can be stored in a purge policy storage in the memory. The control table entry can be stored in a control table in the memory. The grain can be stored in a silo in the memory. The grain can include an identity indicator, a behavior indicator, and a state indicator.

In another implementation, a computer-based method comprises (a) receiving, at a data management platform, a current data table in a database; (b) generating an identification identifying the current data table; (c) associating the identification with a purge statement configured to perform a data purge of the current data table; (d) generating a control table entry associating the purge statement with a grain for the data purge; (e) extracting, at the database, the purge statement and the grain from the control table entry; (f) performing the data purge of the current data table in the database upon execution of the extracted purge statement and the grain to generate purge data and non-purge data, wherein the step (f) of performing the data purge is independent of and agnostic of a specification of the data management platform based on execution of the extracted purge statement and the grain; and (g) generating an updated data table in the database based on the purge data and non-purge data.

The computer-based method can further comprise, between steps (d) and (e), (d1) distributing the control table entry to the database. The computer-based method can further comprise, after step (g), (h) determining whether a predetermined update period has elapsed; (i) in a case that the predetermined update period has elapsed in step (h), repeating steps (a)-(h); and (j) in a case that the predetermined update period has not elapsed in step (h), repeating step (h). The computer-based method can further comprise, between steps (f) and (g), (f1) associating a timestamp with the purge data; (f2) determining whether a predetermined purge period has elapsed based on the timestamp; (f3) in a case that the predetermined purge period has elapsed, performing a final purge of the purge data; and (f4) in a case that the predetermined purge period has not yet elapsed, loop back to step (f2). The computer-based method can further comprise, between steps (f1) and (f2), (ff1) storing the predetermined purge period in a purge policy storage. The computer-based method can further comprise, between steps (d) and (e), (d1) storing the control table entry in a control table.

In a further implementation, a non-transitory computer-readable storage medium stores instructions executable by a processor to, with the instructions comprising: (a) receiving, at a data management platform, a current data table in a database; (b) generating an identification identifying the current data table; (c) associating the identification with a purge statement configured to perform a data purge of the current data table; (d) generating a control table entry associating the purge statement with a grain for the data purge; (e) extracting, at the database, the purge statement and the grain from the control table entry; (f) performing the data purge of the current data table in the database upon execution the extracted purge statement and the grain to generate purge data and non-purge data, wherein the step (f) of performing the data purge is independent of and agnostic of a specification of the data management platform based on execution of the extracted purge statement and the grain; and (g) generating an updated data table in the database based on the purge data and non-purge data.

The non-transitory computer-readable storage medium can further comprise, between steps (d) and (e), (d1) distributing the control table entry to the database. The non-transitory computer-readable storage medium can further comprise, after step (g), (h) determining whether a predetermined update period has elapsed; (i) in a case that the predetermined update period has elapsed in step (h), repeating steps (a)-(h); and (j) in a case that the predetermined update period has not elapsed in step (h), repeating step (h).

The non-transitory computer-readable storage medium can further comprise, between steps (f) and (g), (f1) associating a timestamp with the purge data; (f2) determining whether a predetermined purge period has elapsed based on the timestamp; (f3) in a case that the predetermined purge period has elapsed, performing a final purge of the purge data; and (f4) in a case that the predetermined purge period has not yet elapsed, loop back to step (f2). The non-transitory computer-readable storage medium can further comprise, between steps (f1) and (f2), (ff1) storing the predetermined purge period in a purge policy storage. The non-transitory computer-readable storage medium can further comprise, between steps (d) and (e), (d1) storing the control table entry in a control table.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

BRIEF DESCRIPTION OF THE DRAWINGS

FIG. 8 is an example of a procedure to search for tables for a data purge.

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 200 and methods 900, 1000 to purge data from databases in an agnostic manner using grains.

Figure 1:
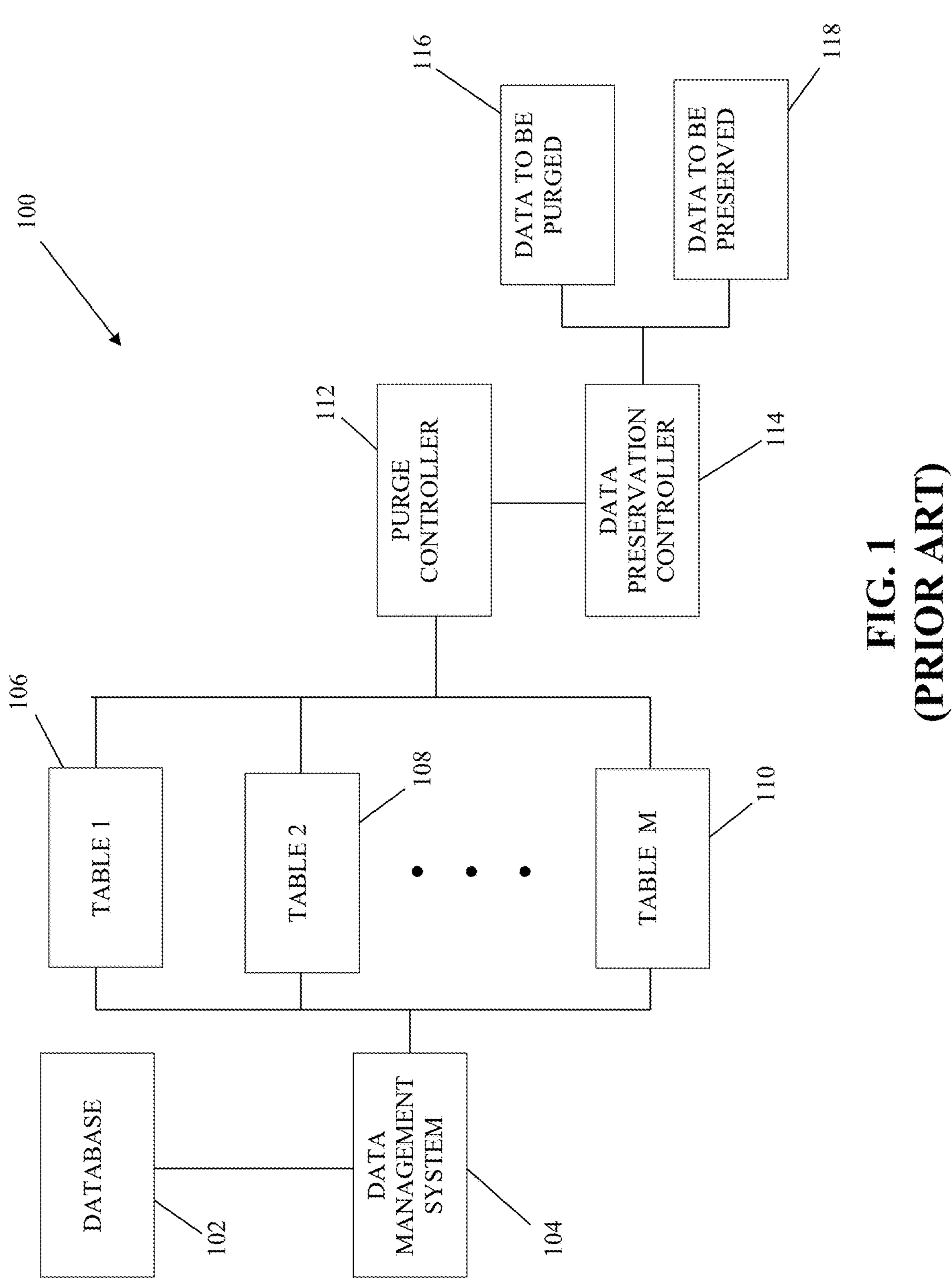
FIG. 1 is a schematic of a data purge system in the prior art.
Figure 2:
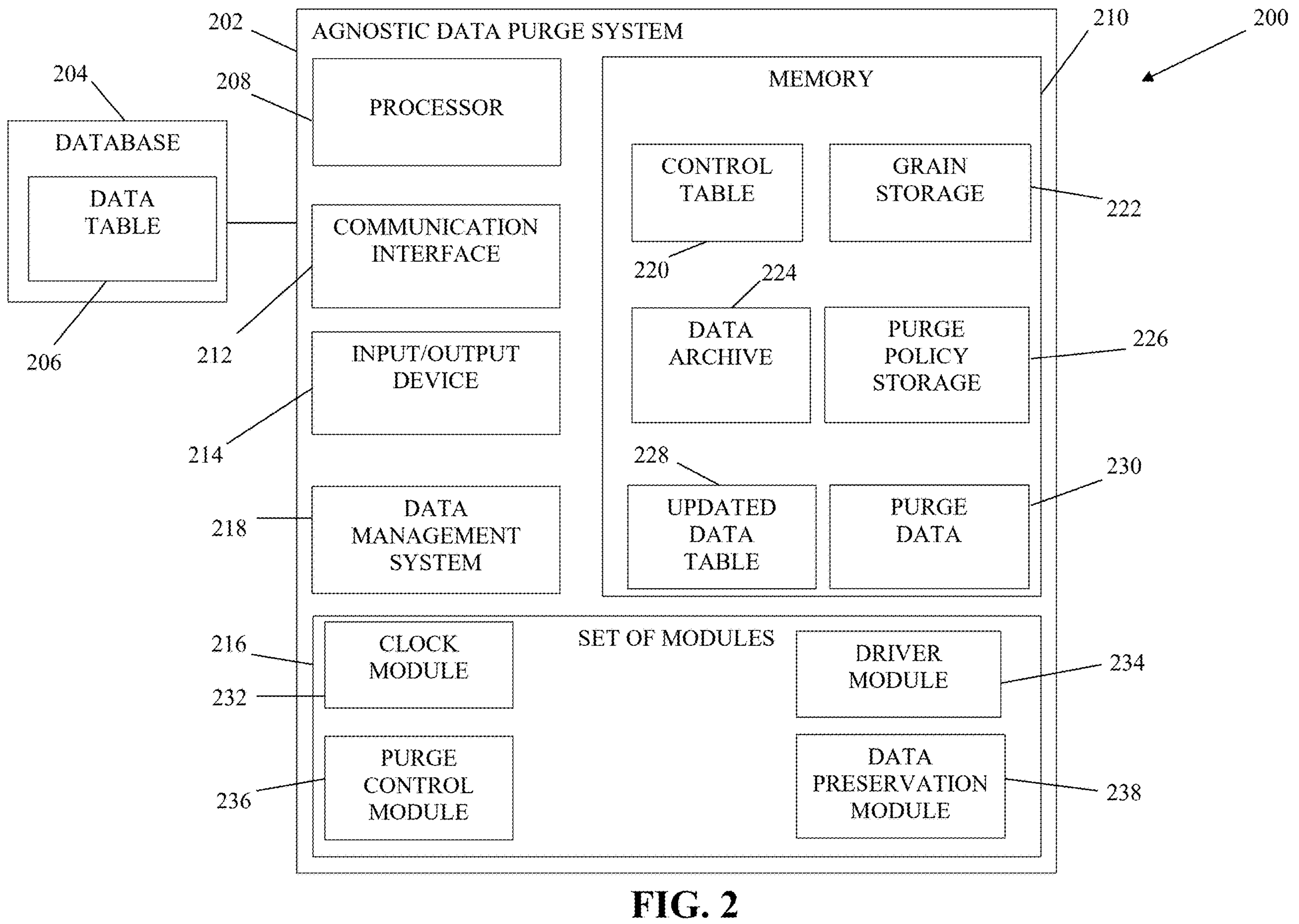
FIG. 2 is a schematic of an agnostic data purge system, according to an implementation.

Referring to FIG. 2, in an implementation consistent with the invention, the system 200 includes an agnostic data purge system 202 operatively connected to at least one database 204 storing data in at least one data table 206. In an implementation consistent with the invention, the agnostic data purge system 202 includes a hardware-based processor 208, a memory 210 configured to store instructions and configured to provide the instructions to the hardware-based processor 208, a communication interface 212, an input/output device 214, and a set 216 of modules configured to implement the instructions provided to the hardware-based processor 208. In one implementation, the agnostic data purge system 202 includes a data management system 218 as shown in FIG. 1. In another implementation, the agnostic data purge system 202 and the database 204 are operatively connected to a data management system 218 external to the agnostic data purge system 202.

Figure 4:
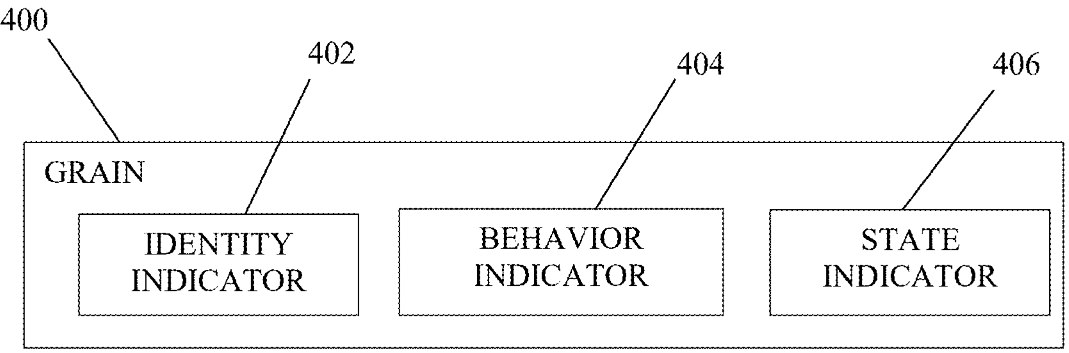
FIG. 4 is a schematic of a grain in the prior art.

In an implementation as shown in FIG. 2, the memory 210 includes a control table 220 storing purge control instructions, a grain storage 222, a data archive 224, a purge policy storage, an updated data table 228 which is an updated version of the data table 206 stored in the database 204, and purge data 230 to be purged. The grain storage 222 stores a grain as described below Referring to FIG. 4, a grain 400 is an entity known in the art which includes an identity indicator 402, a behavior indicator 404, and a state indicator 406. Grains are a basic building block of an application, such as an application compatible with the ORLEANS framework available from MICROSOFT CORPORATION. ORLEANS is a cross-platform framework for building robust, scalable, and distributed applications. The identifier indicator 402 is a user-defined key that makes the grain 400 always available for a call. A grain 400 can be called by external clients such as other grains or World Wide Web frontends through strongly-typed communication interfaces such as contracts. Each grain is an instance of a class that implements one or more of such communication interfaces. A grain can have a volatile state in memory or a persistent state, as specified in the state indicator 406 shown in FIG. 4. The grain 400 can be stored in any storage system. In the implementation shown in FIGS. 2 and 4-5, the grain storage 222 storing grains 400 is referred to as a "silo". Grains 400 implicitly divide the application state from other information, enabling automatic scalability and simplified failure recovery. When a grain 400 is active, the grain state, represented by the state indicators 406, 506 of FIGS. 4-5, respectively, is saved in memory, reducing latency and data storage load of the system 200.

Figure 5:
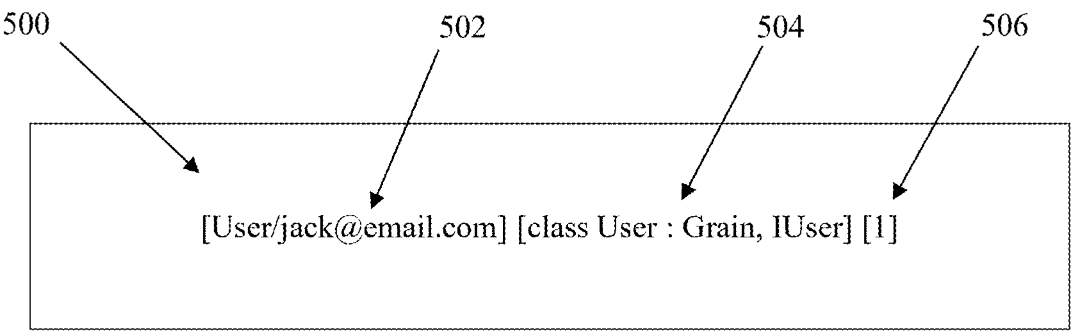
FIG. 5 is an example of a grain shown in FIG. 4.

Referring to FIG. 5, an example of a grain 500 includes "User/jack@email.com" as the identity identifier 502, includes "class User: Grain, IUser" as the behavior indicator 504, and includes "1" as the state indicator 506. In one implementation, the state indicator 506 is "1" when the grain has a volatile state in memory, or "0" when the grain has a persistent state. In another implementation, the state indicator 406, 506 in FIGS. 4-5, respectively, is any known datum, data, or a string of characters.

Referring back to FIG. 2, the set 216 of modules includes a clock module 232, a driver module 234, a purge control module 236, and a data preservation module 238. In one implementation, the clock module 232 includes a clock. In another implementation, the clock module 232 generates timestamps including a date or a time. In a further implementation, the clock module 232 determines a current dates and current time. In still another implementation, the clock module 232 determines the passing of a period of time, such as a purge period.

In one implementation, the system 200 and components such as the agnostic data purge system 202 are operatively connected to the database 204, including the data table 206, or any other data source and other devices and systems through a network. For example, the network is the Internet. In another example, the network is an internal network or intranet of an organization. In a further example, the network is a heterogeneous or hybrid network including the Internet and the intranet.

Figure 3:
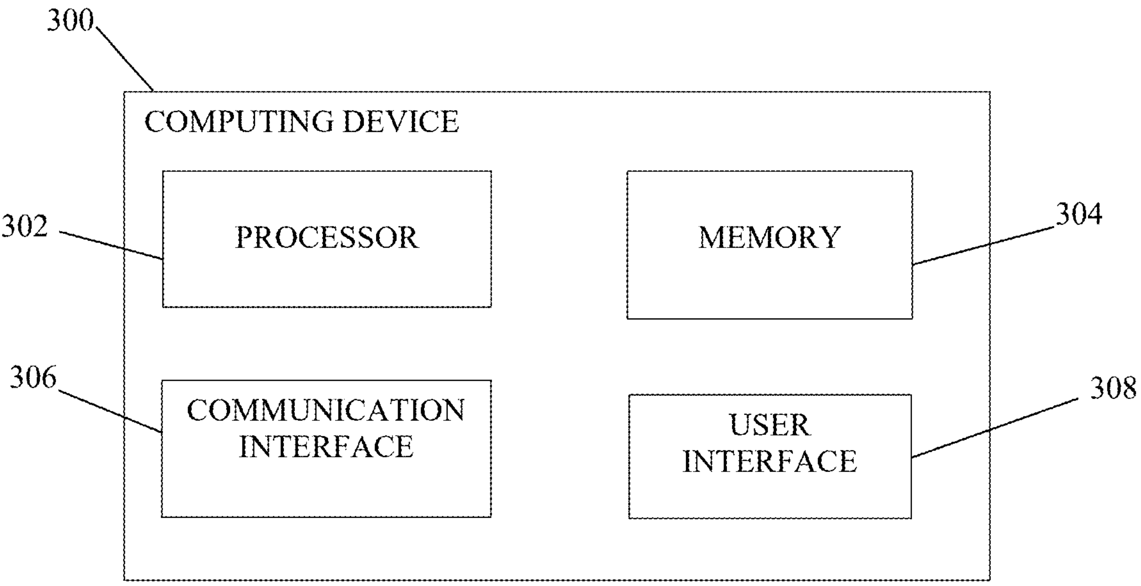
FIG. 3 is a schematic of a computing device used in the implementation of FIG. 2.

FIG. 3 illustrates a schematic of a computing device 300 including a processor 302 having code therein, a memory 304, and a communication interface 306. Optionally, the computing device 300 includes a user interface 308, such as an input device, an output device, or an input/output device. The processor 302, the memory 304, the communication interface 306, and the user interface 308 are operatively connected to each other via any known connections, such as a system bus, a network, etc. Any component, combination of components, and modules of the system 200 in FIG. 2 are, for example, implemented by a respective computing device 300 and described below. In one implementation, a module includes software, such as an application, a procedure, a subroutine, a software-based object, or any known type of software. In another implementation, a module includes hardware, such as a hardware-based computing device, a hardware-based processor, a microprocessor, or any known type of hardware configured to perform functions. In a further implementation, a module includes both software and hardware.

For example, each of the processor 208, the memory 210, the communication interface 212, the input/output device 214, the set 216, the clock module 232, the driver module 234, the purge control module 236, the data preservation module 238, and the data management system 218 shown in FIG. 2 is implemented by a respective computing device 300 shown in FIG. 3 and described below.

It is to be understood that the computing device 300 can include different components. Alternatively, the computing device 300 can include additional components. In another alternative implementation, some or all of the functions of a given component can instead be carried out by one or more different components. The computing device 300 can be implemented by a virtual computing device. Alternatively, the computing device 300 can be implemented by one or more computing resources in a cloud computing environment. Additionally, the computing device 300 can be implemented by a plurality of any known computing devices.

The processor 302 can be a hardware-based processor implementing a system, a sub-system, or a module. The processor 302 can include one or more general-purpose processors. Alternatively, the processor 302 can include one or more special-purpose processors. The processor 302 can be integrated in whole or in part with the memory 304, the communication interface 306, and the user interface 308. In another alternative implementation, the processor 302 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 302 can include a plurality of processing elements configured to perform parallel processing. In a further alternative implementation, the processor 302 can include a plurality of neural nodes or artificial neurons configured as an artificial neural network. The processor 302 can be configured to implement any known machine learning (ML) based devices, any known artificial intelligence (AI) based devices, and any known artificial neural networks, including a convolutional neural network (CNN).

The memory 304 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 302 can be stored in a memory internal to the processor 302. The code can be instructions implemented in hardware. Alternatively, the code can be instructions implemented in software. The instructions can be machine-language instructions executable by the processor 302 to cause the computing device 300 to perform the functions of the computing device 300 described herein. Alternatively, the instructions can include script instructions executable by a script interpreter configured to cause the processor 302 and computing device 300 to execute the instructions specified in the script instructions. In another alternative implementation, the instructions are executable by the processor 302 to cause the computing device 300 to execute an artificial neural network. The processor 302 can be implemented using hardware or software, such as the code. The processor 302 can implement a system, a subsystem, or a module, as described herein.

The memory 304 can store data in any known format, such as databases, data structures, data lakes, or network parameters of a neural network. The data can be stored in a table, a flat file, data in a filesystem, a heap file, a B+ tree, a hash table, or a hash bucket. The memory 304 can be implemented by any known memory, including random access memory (RAM), cache memory, register memory, or any other known memory device configured to store instructions or data for rapid access by the processor 302, including storage of instructions during execution.

The communication interface 306 can be any known device configured to perform the communication interface functions of the computing device 300 described herein. The communication interface 306 can implement wired communication between the computing device 300 and another entity. Alternatively, the communication interface 306 can implement wireless communication between the computing device 300 and another entity. The communication interface 306 can be implemented by an Ethernet, Wi-Fi, Bluetooth, or USB interface. The communication interface 306 can transmit and receive data over a network and to other devices using any known communication link or communication protocol.

The user interface 308 can be any known device configured to perform user input and output functions. The user interface 308 can be configured to receive an input from a user. Alternatively, the user interface 308 can be configured to output information to the user. The user interface 308 can be a display, a computer monitor, a television, a loudspeaker, a computer speaker, or any other known device operatively connected to the computing device 300 and configured to output information to the user. A user input can be received through the user interface 308 implementing a keyboard, a mouse, or any other known device operatively connected to the computing device 300 to input information from the user. Alternatively, the user interface 308 can be implemented by any known touchscreen. In one implementation, the user interface 308 displays a graphical user interface (GUI) interacting with the user through the operation of a keyboard, a mouse, a touchscreen, or any other known user interface (UI) device. The computing device 300 can include a server, a personal computer, a laptop, a smartphone, or a tablet.

Referring to FIG. 2, in one implementation, the driver module 234 periodically commands or polls the database 204 to send a list of accounts or other data in the data table 206 with a purge date and a hard delete date. In another implementation, the database 204 generates and transmits the list of accounts or other data in the data table 206 with a purge date and a hard delete date. The data table 206 operates as a main core table for data stored in accounts of clients or other entities such as employees, patients, or other organizations.

The agnostic data purge system 202 interacts with data management system 218 implemented in any known platform such as the TERADATA platform or the HADOOP platform. In one implementation, the agnostic data purge system 202 deletes accounts or other data designated for purging from the data table 206 operating as a main core table, and so the agnostic data purge system 202 generates the updated data table 228 without the designated accounts or data previously set for purging. The agnostic data purge system 202 stores the data 230 to be purged with the label TERADATA_PURGE_DATABASE in the TERADATA framework, or with the label HADOOP_PURGE_REFINERY in the HADOOP framework. The agnostic data purge system 202 does not perform soft deletes, so the purged accounts are not stored in the updated data table 228. Any query by a user or a reporting application for the purged accounts will be unsuccessful.

In another implementation, using the truncate and reload approach, the agnostic data purge system 202 generates the updated data table 228 with no effect on accounts or data in the data table 206 which are not designated for purging, so the agnostic data purge system 202 has no impact on the data table 206 since the data table 206 does not store a history of non-purged accounts or data.

Figure 7:
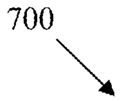
FIG. 7 is an example of columns from a data table indicating status of purging.
Figure 7:
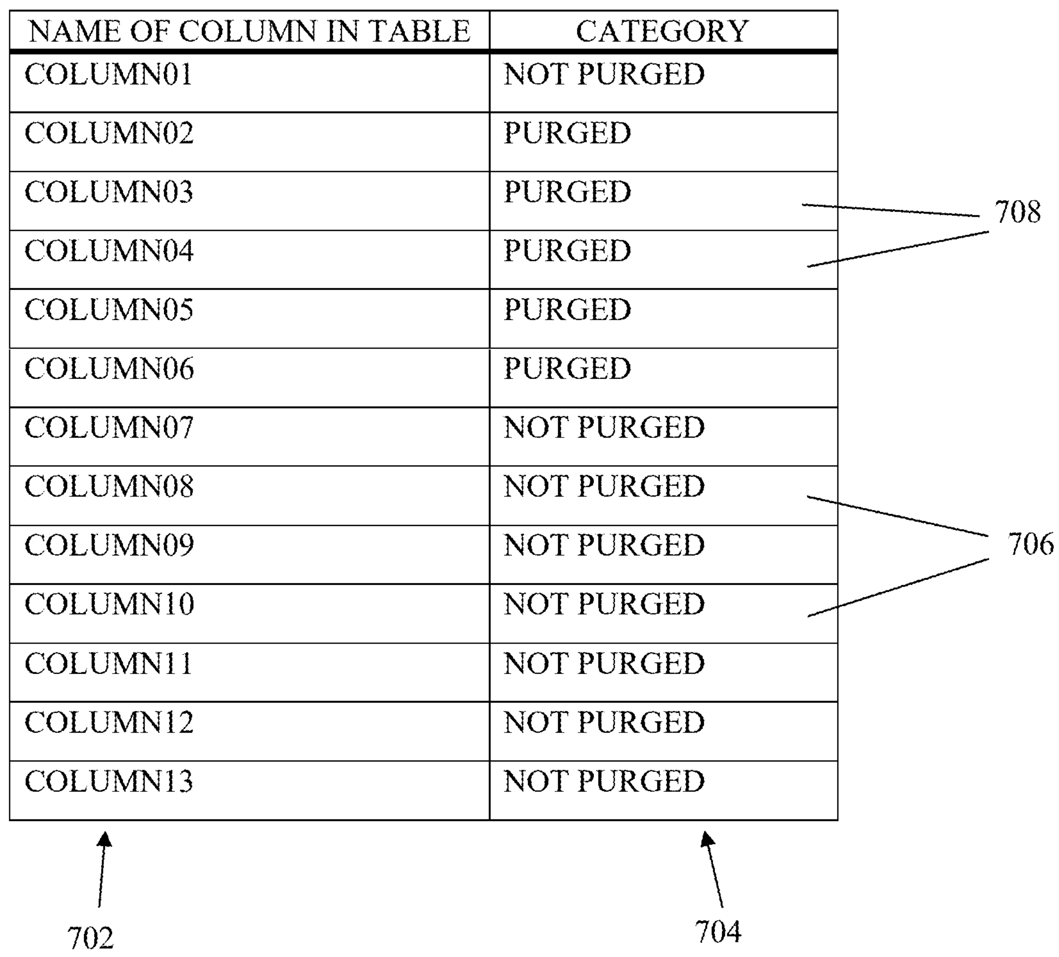

In a further implementation, the agnostic data purge system 202 generates the updated data table 228 by deleting the histories of data in SCD tables of the data table 206, except for any accounts or data subject to exceptions or exemptions. For such exempt accounts or data, the data preservation module 238 preserves non-PII data in the data archive 224 corresponding to non-purge data shown in FIG. 7, while the purge control module 236 sets the PII data in the data archive 224 to be designated to be purged as shown in FIG. 7. As shown in FIG. 7, an example data table 700 has a column 702 with names of data columns in rows in the data table 700, such as COLUMN01, COLUMN02, COLUMN03, etc. The example data table 700 also has a column 704 with designated categories indicating whether the data column 706 is not to be purged, and whether the data column 708 is to be purged. For example, COLUMN08 and COLUMN10 are data columns 706 labeled to not be purged, while COLUMN03 and COLUMN04 are data columns 708 labeled to be purged. The agnostic data purge system 202 stores the data 230 to be purged with appropriate labels. For example, data 230 in the TERADATA framework is labeled TERADATA_PURGE_DATABASE, and data 230 in the HADOOP framework is labeled HADOOP_PURGE_REFINERY.

In still another implementation, for any transaction tables in the data table 206, the agnostic data purge system 202 generates the updated data table 228 with no changes such as purges to such transaction tables. For any transaction tables having PII data, any action at the source of such transactions with PII data is performed at a target table.

After such purges or data retentions, the agnostic data purge system 202 stores the data 230 to be purged in the memory 210. In an implementation consistent with the invention, the data 230 to be purged is a separate database from other memory components of the memory 210 and which is not accessible to anybody. The purge policy storage 226 stores at least one purge rule to trigger purging of the purge data 230, such as a purge date and time. Until the purge rule is triggered, the purge data 230 is not finally deleted or purged.

In one implementation, the purge rule is set by a system administrator entering commands and inputs using the input/output device 214. In another implementation, the purge rule is set by a member of a legal department of the organization using the agnostic data purge system 202, or an agent of such member of the legal department, entering commands and inputs using the input/output device 214. In still another implementation, the purge rule sets a default purge period after which a final purge is performed. For example, the default purge period is one year. The clock module 232 associates or appends a timestamp with the purge data 230 or any tables stored in the purge data 230, and the purge rule in the purge policy storage 226 includes the purge period. In one implementation, the purge period is stored in the purge policy storage 226. In another implementation, the purge period is stored in the memory 210.

In response to the clock module 216 determining that the purge date and time has been attained, or that the purge period has elapsed relative to a timestamp associated with or appended to the purge data 230, the agnostic data purge system 202 performs the final deletion or purging of the purge data 230. Such use of the purge rule in the purge policy storage 226 in conjunction with the clock module 232 eases reporting of the status of the purge data, as well as restoration of the purge data if needed.

Figure 6:
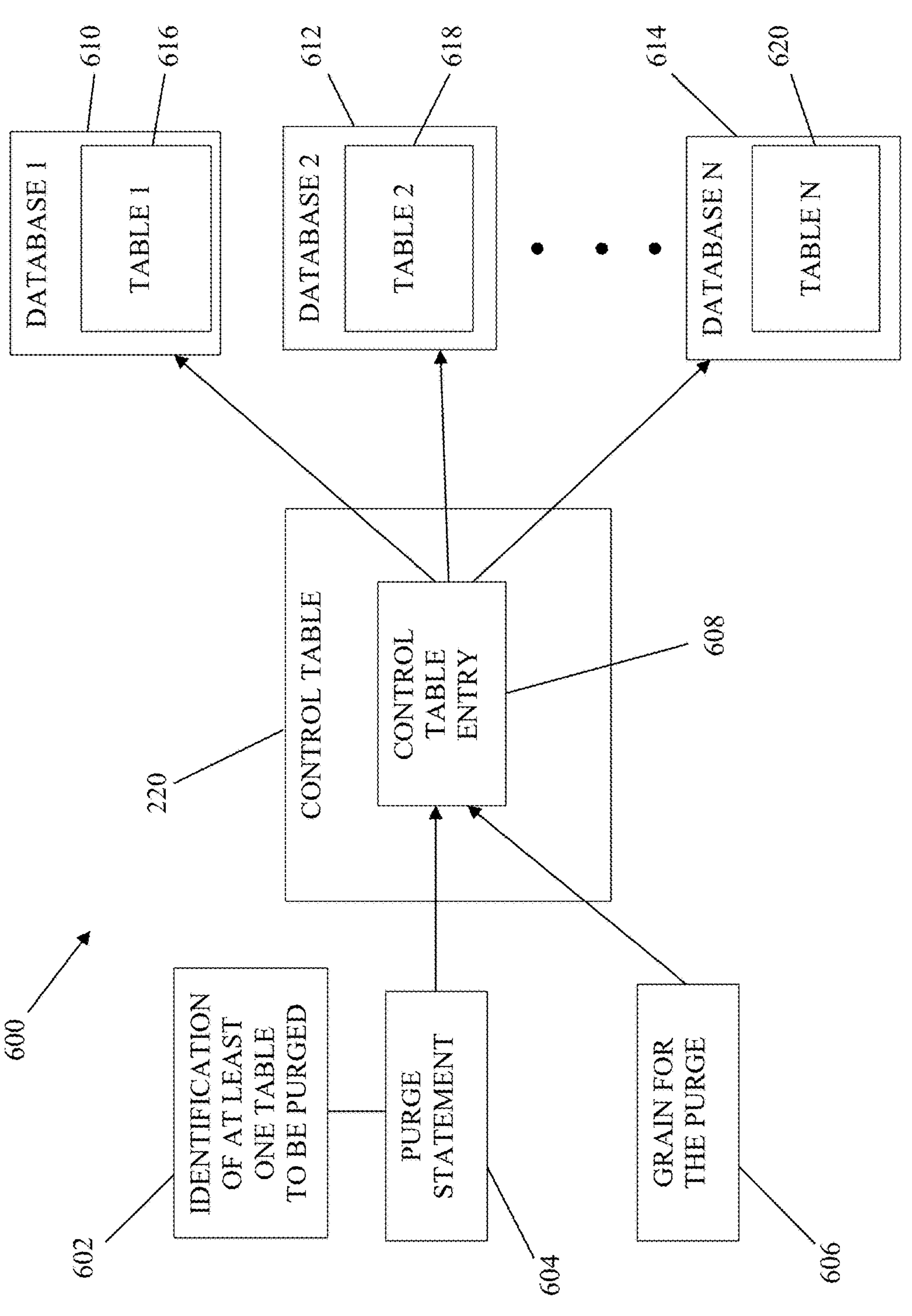
FIG. 6 is a schematic of generation and distribution of a control table entry.

In operation, the agnostic data purge system 202 places control table entries including a grain and a purge statement into a database storing a table to be purged. Referring to FIG. 6, the agnostic data purge system 202 performs a generation operation 600 to purge identified tables having an identification 602 that data in a corresponding table is to be purged. In one implementation, the identification 602 is derived from purge account lists and hard delete dates from the at least one database 204 and the at least one table 206. In another implementation, the identification 602 is derived from scans of the at least one database 204 and the at least one table 206 by the data management system 218.

The agnostic data purge system 202 associates the table identification 602 with a purge statement 604. The agnostic data purge system 202 then associates the purge statement 604 with a grain 606 for the purge, such as the grains 400, 500 shown in FIGS. 4-5. In one implementation, the grain 606 for the purge is an entity configured to implement one or more of communication interfaces, allowing the associated purge statement 604 to implement the specifications of the purge statement 604 to purge specified data in a table or database, as described below.

The agnostic data purge system 202 stores the association of the purge statement 604 and the grain 606 in a control table entry 608, which is saved and stored to the control table 220 in FIG. 2. In one implementation, the agnostic data purge system 202 generates the control table entry 608 from the purge statement 604 and the grain 606. In another implementation, the agnostic data purge system 202 stores the association of the purge statement 604 and the grain 606 in an existing control table entry 608 in the control table 220. In one implementation, the association of the purge statement 604 and the grain 606 is a combination of the purge statement 604 and the grain 606.

As shown in FIG. 6, the agnostic data purge system 202 distributes the control table entry 608 to at least one database having a table, corresponding to the database 204 storing the table 206, respectively, shown in FIG. 2. For example, the at least one database includes the databases 610, 612, 614 labeled "DATABASE 1", "DATABASE 2", etc. to "DATABASE N", respectively, with N being a positive integer greater than or equal to 1. Each of the databases 610, 612, 614 stores a respective at least one table 616, 618, 620, labeled "TABLE 1", "TABLE 2", etc. to "TABLE N", respectively, with the at least one table 616, 618, 620 corresponding to any identification 602 of a table to be purged.

In response to receiving the control table entry 608, each at least one database 610, 612, 614 extracts the purge statement 604 and the grain 606 from the control table entry 60. Each at least one database 610, 612, 614 performs the purge statement 604 using the grain 606 associated with the purge statement 604. The control table 220 acts as a referential control based entry table, allowing the agnostic data purge system 202 to be applicable on all platforms, such as TERADATA platform and the HADOOP platform, and so the agnostic data purge system 202 is agnostic to and not dependent on the particular platform in which the purge statements are distributed and implemented. The grain 606 associate with the purge statement 604 and configured for the purge specifications of the purge statement 604 allows the purge statement 604 to not be dependent on the platform, and so the data purging is performed agnostically.

In another implementation consistent with the invention, the agnostic data purge system 202 is automated to find any tables 616, 618, 620 to delete data using the purge statement 604 in conjunction with the grain 606 for the purge. Such automation of purging is also extensible to any other type of property such as custom grouping. Referring to FIG. 8, for a database of tables labeled DBC.TABLES, the agnostic data purge system 202 executes the code 800 to automatically link to columns in DBC.TABLES to search for specific tables to be purged. In addition, once the table and a database are identified using the code 800, the agnostic data purge system 202 performs an insertion of a query for the identified table into control table entry 608 in FIG. 6 using an INSERT statement.

Once all data in identified tables of databases are stored in the data archive 224 and the purge data 230, the agnostic data purge system 202 generates an updated data table 228 to replace the table 206 in the database 204. After a predetermined update period, the agnostic data purge system 202 repeats the identification of data in identified tables of databases, which is stored in the data archive 224 and the purge data 230, and the agnostic data purge system 202 generates a new updated data table 228 to replace the table 206 in the database 204. In one implementation, the default predetermined update period is one month. In another implementation, the predetermined update period is set by a system administrator entering commands and inputs using the input/output device 214. In another implementation, the predetermined update period is set by a member of a legal department of the organization using the agnostic data purge system 202, or an agent of such member of the legal department, entering commands and inputs using the input/output device 214. The predetermined update period is stored in the memory 210.

Figure 9A:
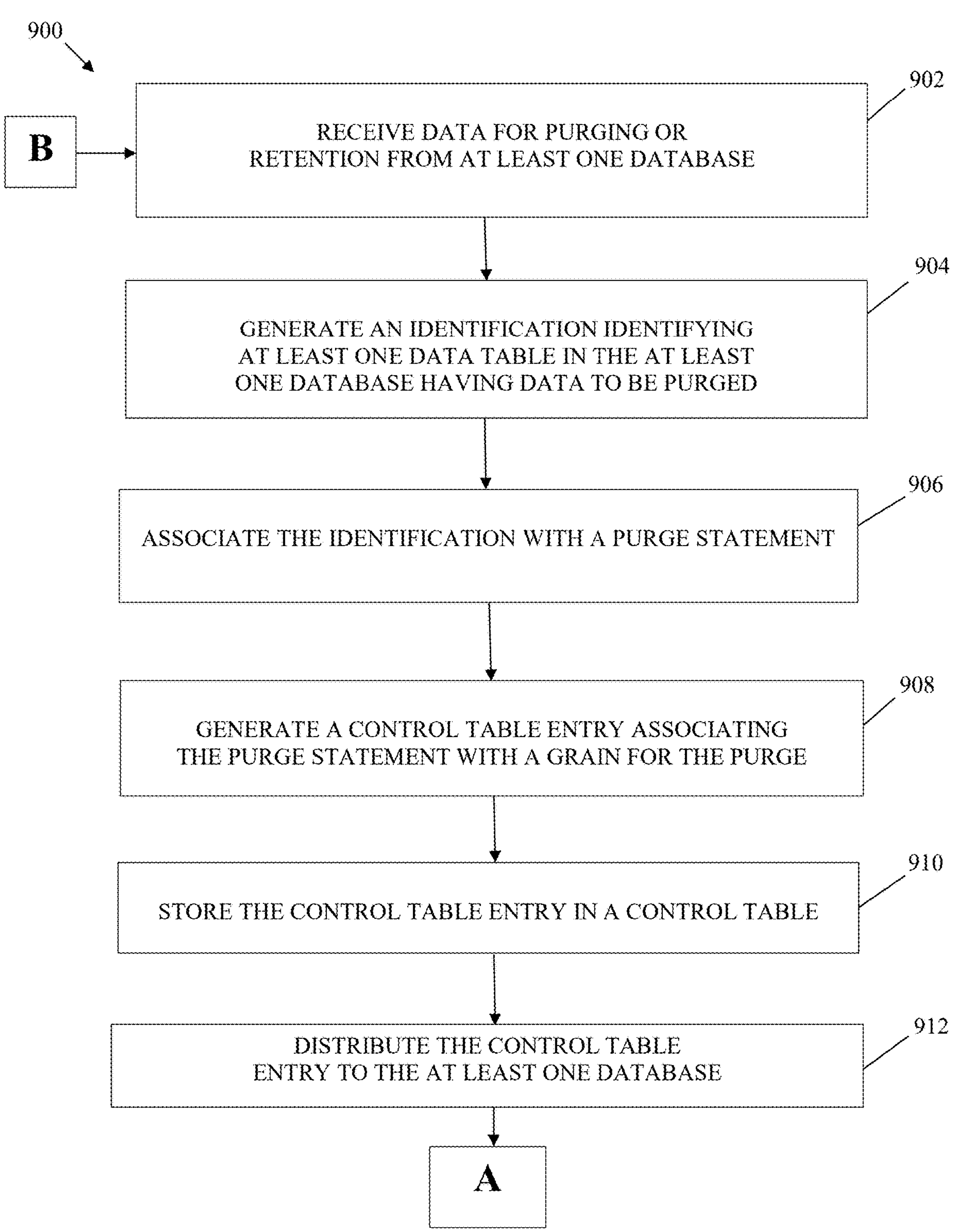
FIGS. 9A-9B are a flowchart of operation of a method implementing the agnostic data purge system of FIG. 2.
Figure 9B:
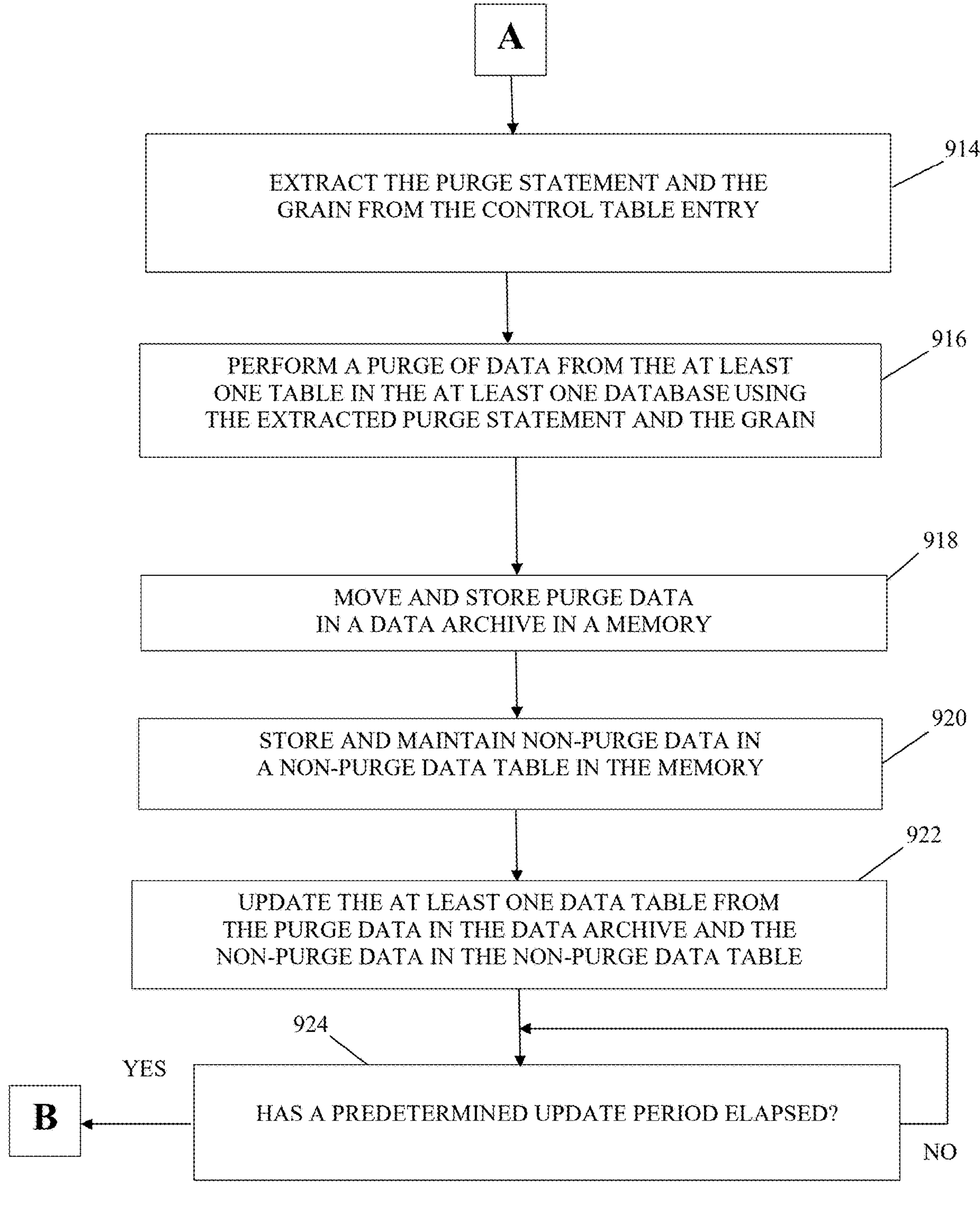

Referring to FIGS. 9A-9B in conjunction with FIGS. 2 and 6, a computer-based method 900 using the agnostic data purge system 202 includes receiving data for purging or retention from at least one database 204 in step 902; generating an identification identifying at least one table 206 in the at least one database 204 having data to be purged in step 904; associating the identification with a purge statement 604 in step 906; generating a control table entry 608 associating the purge statement with a grain 606 for the purge in step 908; storing the control table entry 608 in a control table 220 in step 910; distributing the control table entry 608 to the at least one database 204 in step 912; extracting the purge statement 604 and the grain 606 from the control table entry 608 in step 914; performing a purge of data from at least one data table 206 in the at least one database 204 using the extracted purge statement 604 and the grain 606 in step 916; moving and storing the purge data 230 in the data archive 224 in the memory 210 in step 918; storing and maintaining non-purge data in a non-purge data table in the memory 210 in step 920; updating the at least one data table 206 from the purge data 230 in the data archive 224 and the non-purge data in the data the non-purge data table in the memory 210 in step 922; determining whether a predetermined update period has elapsed in step 924; in a case that the predetermined update period has elapsed, looping back to repeat steps 902-924; and in a case that the predetermined update period has not elapsed, looping back to step 924.

Figure 10:
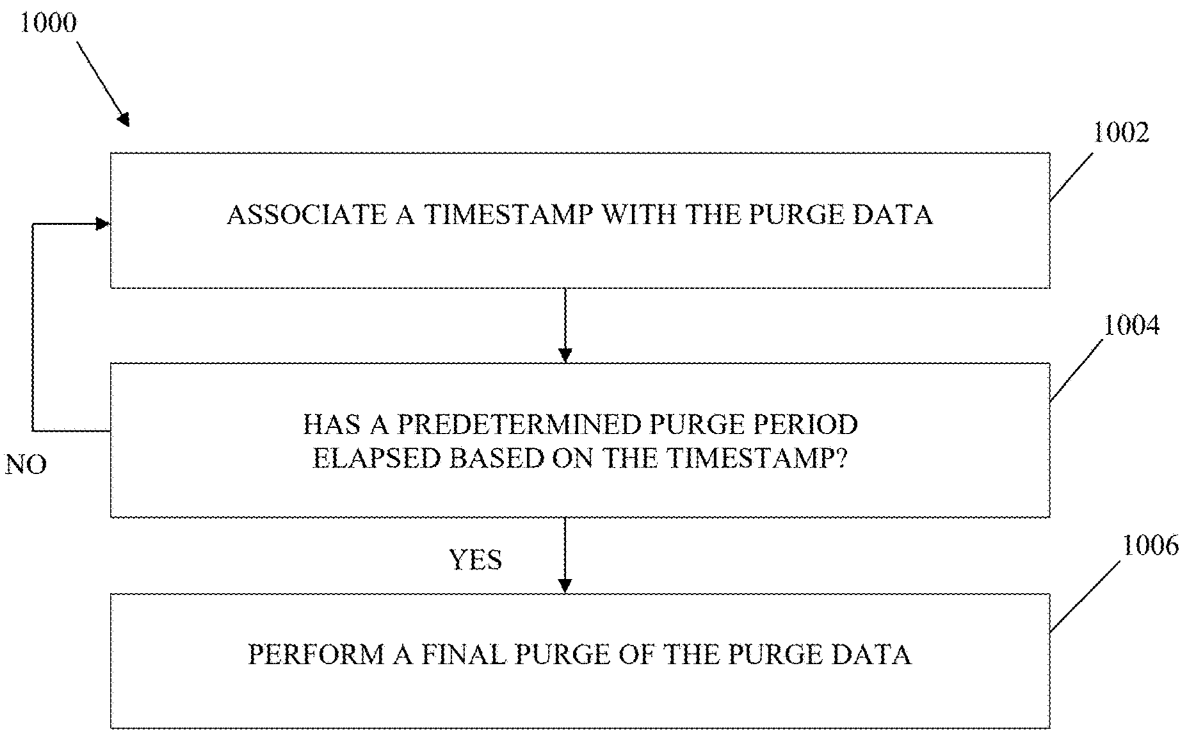
FIG. 10 is a flowchart of performing a final purge using the agnostic data purge system of FIG. 2.

Referring to FIG. 10 in conjunction with FIG. 2, a computer-based method 1000 performs a final purge using the agnostic data purge system of FIG. 2 includes associating a timestamp with the purge data 230 in step 1002, determining whether a predetermined purge period has elapsed based on the timestamp in step 1004, and in a case that the purge period has elapsed, performing the final purge of the purge data 230 in step 1006. However, in step 1004, in a case that the purge period has not yet elapsed, the computer-based method 1000 loops back to perform step 1004.

In an implementation consistent with the invention, a non-transitory computer-readable storage medium stores instructions executable by a processor 208 to purge data from databases in an agnostic manner using grains. The instructions include (a) receiving, at a data management platform, a current data table in a database; (b) generating an identification identifying the current data table; (c) associating the identification with a purge statement configured to perform a data purge of the current data table; (d) generating a control table entry associating the purge statement with a grain for the data purge; (e) extracting, at the database, the purge statement and the grain from the control table entry; (f) performing the data purge of the current data table in the database upon execution the extracted purge statement and the grain to generate purge data and non-purge data, wherein the step (f) of performing the data purge is independent of and agnostic of a specification of the data management platform based on execution of the extracted purge statement and the grain; and (g) generating an updated data table in the database based on the purge data and non-purge data.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to limit the invention. As used herein, the singular forms “a”, “an”, and “the” are intended to include the plural forms as well, unless the context clearly indicates otherwise. It will be further understood that the terms “contains”, “containing”, “includes”, “including”, “comprises”, and/or “comprising”, and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second". Also, the phraseology and terminology used herein is for the purpose of description and should not be regarded as limiting. The use of "including", "comprising", "having", "containing", "involving", and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention is not limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-based system, comprising:

a database storing a current data table; and a data purge system independent of a data management system, the data purge system including:

a hardware-based processor operatively connected to the data management system and to the database, wherein the hardware-based processor is configured to generate an identification identifying the current data table, to associate the identification with a purge statement configured to perform a data purge of the current data table, and to generate a control table entry associating the purge statement with a grain for the data purge;

a clock configured to determine whether a predetermined update period has elapsed; and a memory configured to store instructions and configured to provide the instructions to the hardware-based processor, wherein the database, responsive to receiving the control table entry, extracts the purge statement and the grain from the control table entry, and performs the data purge of the current data table upon execution of the extracted purge statement and the grain to generate purge data and non-purge data, wherein the performance of the data purge is independent of the data management system based on the execution of the extracted purge statement and the grain, wherein the hardware-based processor generates an updated data table as the current data table based on the purge data and non-purge data, wherein in a case that the predetermined update period has elapsed, the hardware-based processor generates a new identification identifying the current data table, associating the identification with a new purge statement configured to perform a new data purge of the current data table, and generating a new control table entry associating the new purge statement with a new grain for the new data purge, wherein in the case that the predetermined update period has elapsed, the database, responsive to receiving the new control table entry, extracts the new purge statement and the new grain from the new control table entry, and performs the new data purge of the current data table upon execution of the extracted new purge statement and the new grain to generate new purge data and new non-purge data, wherein the performance of the new data purge is independent of the data management system based on execution of the extracted new purge statement and the new grain, wherein in the case that the predetermined update period has elapsed, the hardware-based processor generates a new updated data table based on the new purge data and the new non-purge data, and wherein in a case that the predetermined update period has not elapsed, the hardware-based processor checks the clock to determine whether the predetermined update period has elapsed.

2. The computer-based system of claim 1, wherein the hardware-based processor distributes the control table entry to the database.

3. The computer-based system of claim 1, wherein the clock is configured to associate a timestamp with the purge data and to determine whether a predetermined purge period has elapsed, wherein in a case that the predetermined purge period has elapsed based on the timestamp, the hardware-based processor performs a final purge of the purge data, and wherein in a case that the predetermined purge period has not yet elapsed, the clock determines whether a predetermined purge period has elapsed.

4. The computer-based system of claim 3, wherein the predetermined purge period is stored in a purge policy storage in the memory.

5. The computer-based system of claim 1, wherein the control table entry is stored in a control table in the memory.

6. The computer-based system of claim 1, wherein the grain is stored in a grain storage in the memory.

7. The computer-based system of claim 1, wherein the grain includes an identity indicator, a behavior indicator, and a state indicator.

8. A computer-based method implemented by a data purge system, comprising:

(a) receiving, at a data management system, a current data table in a database, wherein the data purge system is independent of the data management system;

(b) generating an identification identifying the current data table;

(c) associating the identification with a purge statement configured to perform a data purge of the current data table;

(d) generating a control table entry associating the purge statement with a grain for the data purge;

(e) extracting, at the database, the purge statement and the grain from the control table entry;

(f) performing the data purge of the current data table in the database upon execution of the extracted purge statement and the grain to generate purge data and non-purge data, wherein the step (f) of performing the data purge is independent of the data management system based on execution of the extracted purge statement and the grain;

(g) generating an updated data table in the database based on the purge data and non-purge data;

(h) determining whether a predetermined update period has elapsed;

(i) in a case that the predetermined update period has elapsed in step (h), repeating steps (a)-(h); and (j) in a case that the predetermined update period has not elapsed in step (h), repeating step (h).

9. The computer-based method of claim 8, further comprising, between steps (d) and (e):

(d1) distributing the control table entry to the database.

10. The computer-based method of claim 8, further comprising, between steps (f) and (g):

(f1) associating a timestamp with the purge data;

(f2) determining whether a predetermined purge period has elapsed based on the timestamp;

(f3) in a case that the predetermined purge period has elapsed, performing a final purge of the purge data; and (f4) in a case that the predetermined purge period has not yet elapsed, loop back to step (f2).

11. The computer-based method of claim 10, further comprising, between steps (f1) and (f2):

(ff1) storing the predetermined purge period in a purge policy storage.

12. The computer-based method of claim 8, further comprising, between steps (d) and (e):

(d1) storing the control table entry in a control table.

13. A non-transitory computer-readable storage medium storing instructions executable by a processor of a data purge system, the instructions comprising:

(a) receiving, at a data management system, a current data table in a database, wherein the data purge system is independent of the data management system;

(b) generating an identification identifying the current data table;

(c) associating the identification with a purge statement configured to perform a data purge of the current data table;

(d) generating a control table entry associating the purge statement with a grain for the data purge;

(e) extracting, at the database, the purge statement and the grain from the control table entry;

(f) performing the data purge of the current data table in the database upon execution the extracted purge statement and the grain to generate purge data and non-purge data, wherein the step (f) of performing the data purge is independent of the data management system based on execution of the extracted purge statement and the grain;

(g) generating an updated data table in the database based on the purge data and non-purge data;

(h) determining whether a predetermined update period has elapsed;

(i) in a case that the predetermined update period has elapsed in step (h), repeating steps (a)-(h); and (i) in a case that the predetermined update period has not elapsed in step (h), repeating step (h).

14. The non-transitory computer-readable storage medium of claim 13, further comprising, between steps (d) and (e):

(d1) distributing the control table entry to the database.

15. The non-transitory computer-readable storage medium of claim 13, further comprising, between steps (f) and (g):

(f1) associating a timestamp with the purge data;

(f2) determining whether a predetermined purge period has elapsed based on the timestamp;

(f3) in a case that the predetermined purge period has elapsed, performing a final purge of the purge data; and (f4) in a case that the predetermined purge period has not yet elapsed, loop back to step (f2).

16. The non-transitory computer-readable storage medium of claim 15, further comprising, between steps (f1) and (f2):

(ff1) storing the predetermined purge period in a purge policy storage.

17. The non-transitory computer-readable storage medium of claim 13, further comprising, between steps (d) and (e):

(d1) storing the control table entry in a control table.

* * * * *